United States Patent
Takeuchi et al.

(10) Patent No.: US 7,432,001 B1
(45) Date of Patent: Oct. 7, 2008

(54) PREVENTION OF LITHIUM DEPOSITION IN NONAQUEOUS ELECTROLYTE CELLS BY ELECTROLYTE-TO-CATHODE WEIGHT RATIO

(75) Inventors: Esther S. Takeuchi, East Amherst, NY (US); Randolph Leising, Williamsville, NY (US); Marcus Palazzo, Wheatfield, NY (US)

(73) Assignee: Greatbatch Ltd., Clarence, NY (US)

( * ) Notice: Subject to any disclaimer, the term of this patent is extended or adjusted under 35 U.S.C. 154(b) by 816 days.

(21) Appl. No.: 11/007,933

(22) Filed: Dec. 9, 2004

Related U.S. Application Data

(60) Provisional application No. 60/528,134, filed on Dec. 9, 2003.

(51) Int. Cl.
H01M 2/22 (2006.01)
H01M 4/54 (2006.01)

(52) U.S. Cl. ............................ 429/3; 429/50; 429/161; 429/219; 429/231.5

(58) Field of Classification Search .................... 429/3, 429/50, 161, 219, 231.5; 29/623.1
See application file for complete search history.

(56) References Cited

U.S. PATENT DOCUMENTS

| | | | | |
|---|---|---|---|---|
| 4,209,576 A | * | 6/1980 | Heurtel | 429/161 |
| 4,310,609 A | | 1/1982 | Liang et al. | |
| 4,391,729 A | | 7/1983 | Liang et al. | |
| 4,830,940 A | * | 5/1989 | Keister et al. | 429/94 |
| 5,435,874 A | | 7/1995 | Takeuchi et al. | |
| 5,472,810 A | | 12/1995 | Takeuchi et al. | |
| 5,516,340 A | | 5/1996 | Takeuchi et al. | |
| 5,545,497 A | | 8/1996 | Takeuchi et al. | |
| 5,571,640 A | | 11/1996 | Takeuchi et al. | |
| 5,695,892 A | | 12/1997 | Leising et al. | |
| 5,716,422 A | | 2/1998 | Muffoletto et al. | |
| 5,716,735 A | | 2/1998 | Muffoletto et al. | |
| 6,221,534 B1 | | 4/2001 | Takeuchi et al. | |
| 6,413,669 B1 | | 7/2002 | Takeuchi et al. | |
| 6,451,483 B1 | * | 9/2002 | Probst et al. | 429/231.7 |
| 6,558,845 B1 | | 5/2003 | Leising et al. | |
| 6,566,007 B1 | | 5/2003 | Takeuchi et al. | |
| 6,685,752 B2 | | 2/2004 | Leising et al. | |
| 6,696,201 B2 | | 2/2004 | Leising et al. | |
| 6,797,017 B2 | | 9/2004 | Leising et al. | |
| 7,005,214 B2 | * | 2/2006 | Takeuchi et al. | 429/245 |
| 7,068,036 B1 | * | 6/2006 | Syracuse et al. | 324/427 |

OTHER PUBLICATIONS

Takeuchi, Esther S. and Thiebolt III, William C. Lithium Deposition in Prismatic Lithium Cells During Intermittent Discharge. J. Electrochem. Soc., vol. 138, No. 9, Sep. 1991.

* cited by examiner

*Primary Examiner*—Stephen J. Kalafut
(74) *Attorney, Agent, or Firm*—Michael F. Scalise

(57) ABSTRACT

The prevention of lithium clusters from bridging between the negative and positive portions of a cell during discharge is described. This is done by limiting the amount of electrolyte in the cell, thereby eliminating excess electrolyte pooling above the cell stack. It is in this excess electrolyte that a relatively higher $Li^+$ ion concentration can occur, creating an anodically polarized region resulting in the reduction of lithium ions on the negative and positive surfaces as the concentration gradient is relaxed. Typically, a lithium ion concentration gradient sufficient to cause lithium cluster formation is induced by the high rate, intermittent discharge of a lithium/silver vanadium oxide (Li/SVO) cell.

24 Claims, 5 Drawing Sheets

PREVENTION OF LITHIUM DEPOSITION IN NONAQUEOUS ELECTROLYTE CELLS BY ELECTROLYTE-TO-CATHODE WEIGHT RATIO

CROSS-REFERENCE TO RELATED APPLICATION

This application claims priority from provisional application Ser. No. 60/528,134, filed Dec. 9, 2003.

BACKGROUND OF THE INVENTION

1. Field of the Invention

The present invention generally relates to the conversion of chemical energy to electrical energy. More particularly, this invention is directed to preventing lithium from bridging between the positive and negative portions of a cell during discharge, particularly high rate intermittent pulse discharge. Such lithium bridging is referred to as a "lithium cluster" and should it occur, an internal loading mechanism that prematurely discharges the cell could result.

2. Prior Art

The mechanism controlling lithium deposition between the positive and negative cell portions of a case negative primary lithium electrochemical cell, such as between the cathode lead and casing, is described in the publication by Takeuchi, E. S.; Thiebolt, W. C. *J. Electrochem. Soc.* 138, L44-L45 (1991). While this report specifically discusses measurements made on the lithium/silver vanadium oxide (Li/SVO) system, it also applies to other solid insertion type cathodes used in lithium cells where voltage decreases with discharge.

According to the investigators, lithium deposition is induced by a high rate intermittent discharge of a Li/SVO cell and can form "clusters" bridging between the negative case and the positive connection to the cathode. This conductive bridge can then result in an internal loading mechanism that prematurely discharges the cell.

The mechanism for lithium cluster formation is as follows: at equilibrium, the potential of a lithium anode is governed by the concentration of lithium ions in the electrolyte according to the Nernst equation. If the $Li^+$ ion concentration is increased over a limited portion of the electrode surface, then the electrode/electrolyte interface in this region is polarized anodically with respect to the electrode/electrolyte interface over the remaining portion of the electrode. Lithium ions are reduced in this region of higher concentration and lithium metal is oxidized over the remaining portion of the electrode until the concentration gradient is relaxed. The concentration gradient is also relaxed by diffusion of lithium ions from the region of high concentration to low concentration. However, as long as a concentration gradient exists, deposition of lithium is thermodynamically favored in the region of high lithium ion concentration.

In a Li/SVO cell, $Li^+$ ions are discharged at the anode and subsequently intercalated into the cathode. The anode and cathode are placed in close proximity across a thin separator. Immediately after a pulse discharge, the $Li^+$ ion concentration gradient in the separator is dissipated as the $Li^+$ ions diffuse the short distance from the anode to the cathode and then within the pore structure of the cathode. However, at the electrode assembly edge, the anode edge is not directly opposed by the cathode edge. If excess electrolyte pools at this edge, $Li^+$ ions, which are discharged into the electrolyte pool, have a longer distance to diffuse to the cathode than $Li^+$ ions discharged into the separator. Consequently, this electrolyte pool maintains a higher concentration of $Li^+$ ions for a longer period of time after the pulse discharge.

Typically, the lithium anode tab is welded to the inside of the casing. Therefore, if these components are also wetted by excess electrolyte, this concentration gradient extends over the tab and casing, and lithium cluster deposition is induced onto these surfaces by the Nernstian anodic potential shift derived from the higher $Li^+$ ion concentration in the excess electrolyte pool after the pulse discharge.

SUMMARY OF THE INVENTION

Accordingly, the present invention is directed to the prevention of lithium clusters from bridging between the negative and positive portions of a cell during discharge. Limiting the amount of electrolyte in the cell to thereby eliminate excess electrolyte pooling above the cell stack does this. It is in this excess electrolyte that a relatively higher $Li^+$ ion concentration can occur, creating an anodically polarized region resulting in the reduction of lithium ions on the negative surfaces as the concentration gradient is relaxed. Typically, a lithium ion concentration gradient sufficient to cause lithium cluster formation is induced by the high rate, intermittent discharge of a Li/SVO cell.

These and other aspects of the present invention will become more apparent to those skilled in the art by reference to the following description and to the appended drawings.

DETAILED DESCRIPTION OF THE PREFERRED EMBODIMENTS

A lithium cluster is the result of a higher $Li^+$ ion concentration in the electrolyte immediately adjacent to a surface creating an anodically polarized region resulting in the reduction of lithium ions on the surface as the concentration gradient relaxes. Typically, a lithium ion concentration gradient is induced by the high rate, intermittent discharge of a lithium/solid cathode active chemistry, such as a lithium/silver vanadium oxide cell.

The term "pulse" means a short burst of electrical current of significantly greater amplitude than that of a pre-pulse current or open circuit voltage immediately prior to the pulse. A pulse train consists of at least one pulse of electrical current. The pulse is designed to deliver energy, power or current. If the pulse train consists of more than one pulse, they are delivered in relatively short succession with or without open circuit rest between the pulses. An exemplary pulse train may consist of one to four 5 to 20-second pulses with about a 2 to 30 second rest, preferably about 15 second rest, between each pulse. A typically used range of current densities for cells powering implantable medical devices is from about 15 $mA/cm^2$ to about 50 $mA/cm^2$, and more preferably from about 18 $mA/cm^2$ to about 35 $mA/cm^2$. Typically, a 10 second pulse is suitable for medical implantable applications. However, it could be significantly shorter or longer depending on the specific cell design and chemistry and the associated device energy requirements. Current densities are based on square centimeters of the cathode electrode.

The term percent depth-of-discharge (% DoD) is defined as the ratio of delivered capacity to theoretical capacity, times 100.

An electrochemical cell according to the present invention must have sufficient energy density and discharge capacity in order to be a suitable power source for an implantable medical device. Contemplated medical devices include implantable cardiac pacemakers, defibrillators, neurostimulators, drug pumps, ventricular assist devices, and the like.

Figure 1:
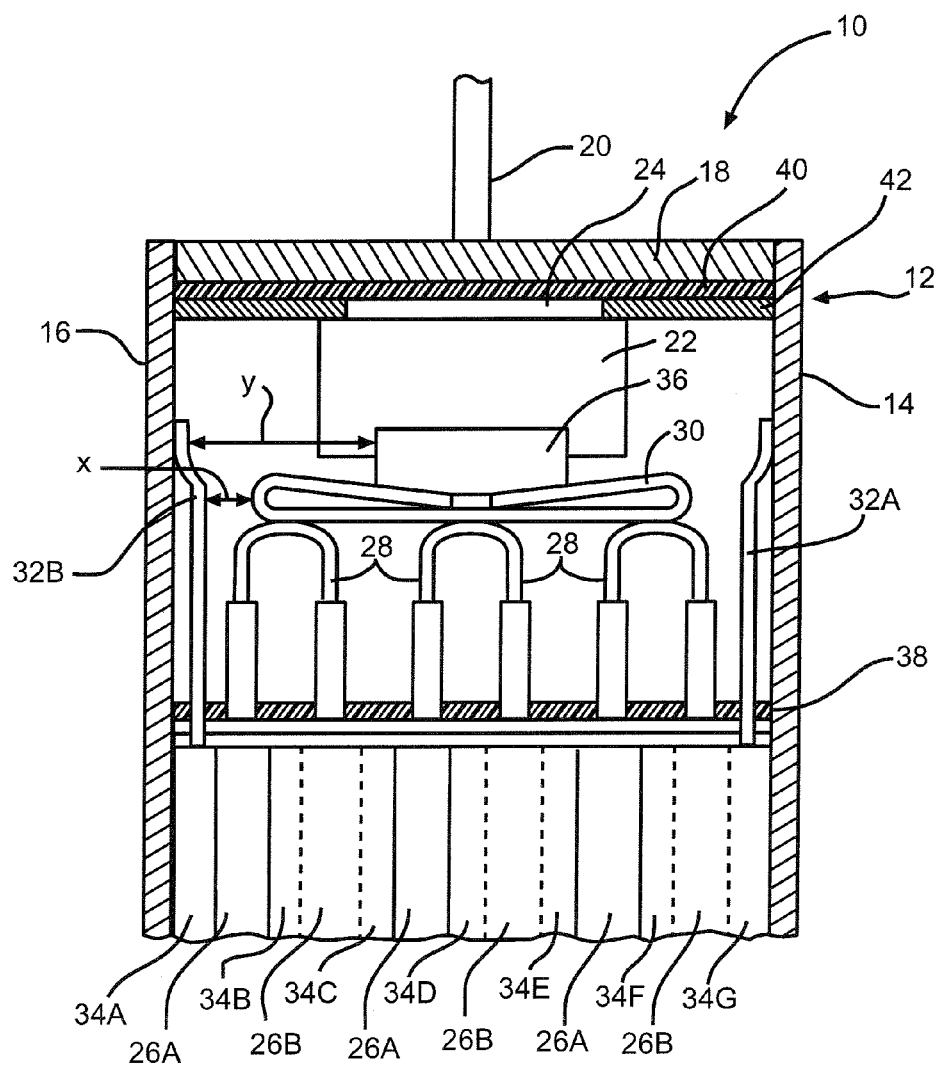
FIG. 1 is a partial sectional view of an exemplary electrochemical cell 10 according to the present invention.

Referring now to the drawings, FIG. 1 shows an electrochemical cell 10 for delivering high current pulses and particularly suited as a power source for an implantable cardiac defibrillator. Cell 10 includes a hollow casing 12 having spaced apart sidewalls 14, 16 extending to spaced apart end walls (not shown) and a bottom wall (not shown). Casing 12 is closed at the top by a lid 18 welded to the sidewalls and end walls in a known manner. Casing 12 is of metal such as stainless steel, and being electrically conductive provides one terminal or contact for making electrical connection between the cell and its load. Lid 18 also is of stainless steel. The other electrical terminal or contact is provided by a conductor or pin 20 extending from within the cell 10 through casing 12, and in particular through lid 18. An insulator cup 22 of a polymeric material such as the thermoplastic fluoropolymers HALAR® or TEFZEL® surrounds and partially encases the ferrule 24 of a glass-to-metal seal structure. As is well known by those skilled in the art, the pin 20 is electrically insulated from the metal lid 18 by the glass-to-metal seal. A plug (not shown) closes an electrolyte fill opening in lid 18.

The cell 10 includes a cathode of a twin cathode plate structure comprising two cathode plates 26A and 26B joined together by an intermediate connector 28. The cathode plates 26A and 26B comprise cathode active bodies contacted to two cathode current collector portions joined by the intermediate conductor portion 28. In the drawing, there is illustrated a cell stack assembly comprising a plurality of these cathode structures. A manifold 30 is connected to each of the intermediate conductors 28. By way of example, the cathode current collectors may be in the form of a thin sheet of metal foil or screen, for example titanium, stainless steel, tantalum, platinum, gold, aluminum, cobalt nickel alloys, nickel-containing alloys, highly alloyed ferritic stainless steel containing molybdenum and chromium, and nickel-, chromium- and molybdenum-containing alloys. The conductor 28 is of a similar material and is in the form of a solid thin tab extending from one cathode current collector screen to the other.

The cathode plates 26A and 26B contain a solid cathode active material that may be of a carbonaceous chemistry or comprise a metal element, a metal oxide, a mixed metal oxide, a metal sulfide, and combinations thereof. The metal oxide, the mixed metal oxide and the metal sulfide are formed by the chemical addition, reaction, or otherwise intimate contact of various metal oxides, metal sulfides and/or metal elements, preferably during thermal treatment, sol-gel formation, chemical vapor deposition or hydrothermal synthesis in mixed states. The active materials thereby produced contain metals, oxides and sulfides of Groups, IB, IIB, IIIB, IVB, VB, VIIB, VIIB and VIII, which includes the noble metals and/or other oxide and sulfide compounds. A preferred cathode active material is a reaction product of at least silver and vanadium.

One preferred mixed metal oxide is a transition metal oxide having the general formula $SM_xV_2O_y$, where SM is a metal selected from Groups IB to VIIB and VIII of the Periodic Table of Elements, wherein x is about 0.30 to 2.0 and y is about 4.5 to 6.0 in the general formula. By way of illustration, and in no way intended to be limiting, one exemplary cathode active material comprises silver vanadium oxide having the general formula $Ag_xV_2O_y$ in any one of its many phases, i.e., β-phase silver vanadium oxide having in the general formula x=0.35 and y=5.8, γ-phase silver vanadium oxide having in the general formula x=0.80 and y=5.40 and ε-phase silver vanadium oxide having in the general formula x=1.0 and y=5.5, and combinations and mixtures of phases thereof. For a more detailed description of such cathode active materials reference is made to U.S. Pat. Nos. 4,310,609 and 4,391,729, both to Liang et al., U.S. Pat. No. 5,545,497 to Takeuchi et al., U.S. Pat. No. 5,695,892 to Leising et al., U.S. Pat. No. 6,221,534 to Takeuchi et al., U.S. Pat. No. 6,413,669 to Takeuchi et al., U.S. Pat. No. 6,558,845 to Leising et al., U.S. Pat. No. 6,566,007 to Takeuchi et al, U.S. Pat. No. 6,685,752 to Leising et al., U.S. Pat. No. 6,696,201 to Leising et al., and U.S. Pat. No. 6,797,017 to Leising et al., which are assigned to the assignee of the present invention and incorporated herein by reference.

Another preferred composite transition metal oxide cathode active material is copper silver vanadium oxide (CSVO), which is described in U.S. Pat. Nos. 5,472,810 to Takeuchi et al. and 5,516,340 to Takeuchi et al. Both are assigned to the assignee of the present invention and incorporated herein by reference.

Another cathode active material is a carbonaceous compound prepared from carbon and fluorine, which includes graphitic and nongraphitic forms of carbon, such as coke, charcoal or activated carbon. Fluorinated carbon is represented by the formula $(CF_x)_n$ wherein x varies between about 0.1 to 1.9 and preferably between about 0.5 and 1.2, and $(C_2F)_n$ wherein the n refers to the number of monomer units, which can vary widely. When the active material is a fluorinated carbon, the titanium cathode current collector has a thin layer of graphite/carbon material, iridium, iridium oxide or platinum applied thereto.

Additional cathode active materials include $V_2O_5$, $MnO_2$, $LiCoO_2$, $LiNiO_2$, $LiMn_2O_4$, $TiS_2$, $Cu_2S$, FeS, $FeS_2$, $Ag_2O$, $Ag_2O_2$, $CuF_2$, $Ag_2CrO_4$, copper oxide, copper vanadium oxide, and mixtures thereof.

Before fabrication into the cathode plates 26A and 26B, the cathode active material is preferably mixed with a binder material such as a powdered fluoro-polymer; more preferably powdered polytetrafluoroethylene or powdered polyvinylidene fluoride present at about 1 to about 5 weight percent of the cathode mixture. Further, up to about 10 weight percent of a conductive diluent is preferably added to the cathode mixture to improve conductivity. Suitable materials for this purpose include acetylene black, carbon black and/or graphite or a metallic powder such as powdered nickel, aluminum, titanium and stainless steel. The preferred cathode active mixture thus includes a powdered fluoro-polymer binder present at about 3 weight percent, a conductive diluent present at about 3 weight percent and about 94 weight percent of the cathode active material.

The anode comprises a continuous elongated element or structure of alkali metal, preferably lithium or lithium alloy, enclosed within a separator material and folded into a plurality of sections interposed between the twin plate cathode plates. In particular, the anode comprises an elongated continuous ribbon like anode current collector (not shown) in the form of a thin metal screen, for example nickel. The anode current collector includes two tabs 32A and 32B extending from opposite side edges thereof. The anode further comprises a pair of elongated ribbon-like lithium sheets pressed together against opposite sides of the anode current collector. These lithium sheets are substantially equal in width and length to the anode current collector with the result that the anode is of a sandwich-like construction. The anode is enclosed or wrapped in an envelope of separator material (not shown), for example polypropylene or polyethylene, and folded at spaced intervals along its length to form a serpentine-like structure that receives the plurality of twin plate cathode structures between the folds to form the cell stack assembly.

In particular, the anode is folded at spaced intervals to provide anode plates 34A, 34B, 34C, 34D, 34E, 34F and 34G along the length thereof. Three sets of the twin plate cathode plates 26A and 26B described above are received between adjacent anode plates to form the cell stack assembly that is received in the cell casing 12. While three sets of the twin cathode plates are shown, it is understood that any number of plate structures may be utilized in the cell stack depending on the cell requirements. Of course, if more or less than three sets of twin cathode plates are use, the anode plates are adjusted accordingly.

The conductor pin 20 extending through the glass-to-metal seal and electrically isolated from the casing 12 is formed into a bend such that its proximal end snugly fits into one end of a coupling sleeve secured by welding to an intermediate lead 36. The intermediate lead 36 is, in turn, connected to the manifold 30 such as by welding.

A cell stack insulator 38 in the form of a thin plate of a polymeric material rests on top of the upper edges on the cathode plates and the serpentine anode. The insulator 38 is provided with slots that receive the cathode connectors 28 and the anode tabs 32A and 32B as it is slipped onto the cell stack in an orientation perpendicular to the plane of the drawing. Insulator is provided to prevent internal electrical short circuits, and by way of example, can be of the thermoplastic fluoropolymers HALAR® or TEFZEL®.

A shield element 40 is positioned adjacent to and in contact with the inner surface of lid 24. This shield is in the form of a thin plate-like strip, elongated rectangularly, and of a size and configuration to cover the surface of lid 18 and provided with openings to accommodate the glass-to-metal seal 30. A second, similarly sized shield element 42 is adjacent to and in contact with shield 40. The shields 40 and 42 protect the internal components of the cell 10 including the electrolyte within casing 12 from heat during welding of lid 18 to casing 12 and the fill plug into the electrolyte fill opening in the lid. By way of example, shield 40 is of stainless steel and shield 42 is of mica.

While the invention has been described with the anode and cathode in the form of alternating plates, that is by way of example only. The cell stack may also comprise the cathode in the form of a strip wound with a corresponding strip of anode material in a structure similar to a "jellyroll" or be of a multiplate construction with plate anodes.

In order to prevent internal short circuit conditions, the cathode is separated from the anode by a suitable separator material. The separator is of electrically insulative material, and also is chemically unreactive with the anode and cathode active materials and both chemically unreactive with and insoluble in the electrolyte. In addition, the separator material has a degree of porosity sufficient to allow there flow through of the electrolyte during the electrochemical reaction of the cell. Illustrative separator materials include fabrics woven from fluoropolymeric fibers including polyvinylidine fluoride, polyethylenetetrafluoroethylene, and polyethylenechlorotrifluoroethylene used either alone or laminated with a fluoropolymeric microporous film, non-woven glass, polypropylene, polyethylene, glass fiber materials, ceramics, a polytetrafluoroethylene membrane commercially available under the designation ZITEX® (Chemplast Inc.), a polypropylene membrane commercially available under the designation CELGARD® (Celanese Plastic Company, Inc.), a paper membrane commercially available under the designation DEXIGLAS (C. H. Dexter, Div., Dexter Corp.), and a polymeric membrane commercially available from Tonen Chemical Corp. under the designation TONEN.

The electrochemical cell 10 further includes a nonaqueous, ionically conductive electrolyte that serves as a medium for migration of ions between the anode and the cathode electrodes during electrochemical reactions of the cell. A suitable electrolyte has an inorganic, ionically conductive salt dissolved in a nonaqueous solvent, and more preferably, an ionizable lithium salt dissolved in a mixture of aprotic organic solvents comprising a low viscosity solvent and a high permittivity solvent. The salt serves as the vehicle for migration of the anode ions to intercalate or react with the cathode active materials and suitable salts include $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, $LiSCN$, $LiO_3SCF_3$, $LiC_6F_5SO_3$, $LiO_2CCF_3$, $LiSO_6F$, $LiB(C_6H_5)_4$, $LiCF_3SO_3$, and mixtures thereof.

Useful low viscosity solvents include esters, linear and cyclic ethers and dialkyl carbonates such as tetrahydrofuran, methyl acetate, diglyme, trigylme, tetragylme, dimethyl carbonate, 1,2-dimethoxyethane, 1,2-diethoxyethane, 1-ethoxy, 2-methoxyethane, ethyl methyl carbonate, methyl propyl carbonate, ethyl propyl carbonate, diethyl carbonate, dipropyl carbonate, and mixtures thereof. Suitable high permittivity solvents include cyclic carbonates, cyclic esters, cyclic amides and a sulfoxide such as propylene carbonate, ethylene carbonate, butylene carbonate, acetonitrile, dimethyl sulfoxide, dimethyl formamide, dimethyl acetamide, γ-valerolactone, γ-butyrolactone, N-methyl-pyrrolidinone, and mixtures thereof. In the present invention, the preferred anode active material is lithium metal, the preferred cathode active material is SVO and the preferred electrolyte is 0.8M to 1.5M $LiAsF_6$ or $LiPF_6$ dissolved in a 50:50 mixture, by volume, of propylene carbonate and 1,2-dimethoxyethane.

The metallic casing may comprise materials such as stainless steel, mild steel, nickel-plated mild steel, titanium, tantalum or aluminum, but not limited thereto, so long as the metallic material is compatible for use with components of the cell. The glass used in the glass-to-metal seal is of a corrosion resistant type having up to about 50% by weight silicon such as CABAL 12, TA 23, FUSITE 425 or FUSITE 435. The positive terminal pin preferably comprises titanium although molybdenum, aluminum, nickel alloy, or stainless steel can also be used. The cell lid is typically of a material similar to that of the casing. The cell is thereafter filled with the electrolyte solution described hereinabove and hermetically sealed such as by close-welding a stainless steel ball over the fill hole, but not limited thereto.

According to the present invention, the electrolyte is filled into the casing to activate the anode and the cathode to a prescribed amount based on the gram amount of cathode active material. This is referred to as an E/C ratio. For a particular cell construction, the preferred E/C ratio is one where under pulse discharge conditions suitable for the formation of lithium clusters, the total lithium cluster surface area is less than the nominal gap distance between a positive polarity member and a negative polarity member.

In that respect, criteria have been established which define a critical lithium cluster as one that is large enough to bridge a gap between a negative polarity portion, such as the casing, and a positive polarity portion, such as the cathode bridge (lead). In Li/SVO cell commercially available from Wilson Greatbatch Technologies, Inc, Clarence, N.Y., the cathode lead is centered over the cell stack leaving from about 0.140 to about 0.150 inches from the case wall to the lead. In some instances, the cathode lead is as close as about 0.05 to about 0.112 inches to the case wall. The orientation and location of a critical cluster must also be defined. A critical cluster must be located in the region of the cell where the case wall and the cathode lead are nearest in proximity and must be oriented perpendicularly to the case wall. All three criteria, size, location and orientation must be met in order for a cluster to be classified as critical.

In FIG. 1, distance "x" is the nominal gap between the positive manifold 30 and the negative leads 32A and 32B. In some cell designs, an insulator (not shown) covers the intermediate conductor portions 28 and the manifold 30. However, there can still be left exposed some portion of the intermediate lead 36. In that case, the critical gap distance "y" is between this positive lead and the negative leads 32A and 32B or the casing sidewalls 14 and 16. As previously discussed, in the exemplary Li/SVO cell the nominal distance between the positive lead 36 and the casing sidewall can be as close as 0.112 inches. It is known that an E/C ratio of about 0.40, or less results in virtually no lithium clusters forming in such a cell. An E/C ratio of about 0.46, or less results in lithium clusters having an average surface area less than about 0.007 in$^2$. Therefore, an E/C ratio of about 0.46, or less is acceptable in an exemplary Li/SVO cell to prevent lithium cluster bridging from the anode leads 32A and 32B secured to the respective casing sidewalls 14 and 16 to a positive portion, i.e. lead 36.

Prior to the present invention, commercially available Li/SVO cells were activated with an E/C ratio of about 0.50. The problem is that at this E/C ratio, there is still free flowing electrolyte above the cell stack up to about 80% DoD. As previously described, it is this free flowing electrolyte that is the medium from which Li$^+$ ions will deposit onto an anodically polarized region of the cell as the lithium ion concentration gradient relaxes. Thus, in such cell designs there is sufficient electrolyte throughout the majority of the discharge of the cell to result in formation of lithium clusters.

On the other hand, for a lithium/solid cathode cell activated with a relatively low E/C ratio of about 0.46, any free flowing electrolyte above the cell stack is depleted at about 30% DoD. For a lithium/solid cathode cell activated with an E/C ratio of about 0.40, free flowing electrolyte above the cell stack is gone at less than about 2% DoD. In such systems the amount of lithium clusters are significantly limited as will be seen in the following example.

While the preferred form of the cell is a case-negative design, the cell can also be constructed in a case-positive configuration. In that configuration, the cathode active material is contacted to the casing by any one of a number of techniques including pressing a powdered mixture of the cathode active mixture to the inner surface of the sidewalls. Other means include forming a freestanding sheet of the cathode active mixture as described in U.S. Pat. Nos. 5,435,874 and 5,571,640, both to Takeuchi et al., that is then press contacted to the inner surface of the casing sidewalls, or by a thermal spay deposited technique, as described in U.S. Pat. No. 5,716,422 to Muffoletto et al. These patents are assigned to the assignee of the present invention and incorporated herein by reference. In either the jellyroll or prismatic electrode assembly, there is a conductor extending from the casing sidewall or the electrode active material contacted thereto, whether of the anode or the cathode, to the other portions of the same polarity electrode not in direct contact with the casing.

The following examples describe the present invention, and they set forth the best mode contemplated by the inventors of carrying out the invention, but they are not to be construed as limiting.

EXAMPLE I

Li/SVO cells commercially available from Wilson Greatbatch Technologies, Inc., Clarence, N.Y. served as a control cell group in this example. The cells were activated with an electrolyte of 1.0M LiAsF$_6$ in a 50:50, by volume, mixture of PC:DME to provide an electrolyte-to-cathode (E/C) weight ratio of about 0.46 to about 0.52 based on a gram amount of the cathode active material. A second group of Li/SVO cells, identical to the control cells except for their electrolyte fill weights, served as the test group. The second cell group contained an average of about 26% less electrolyte than the control group. Their E/C weight ratio was about 0.34 to about 0.37. Each group contained 13 cells.

The control and test cells were then subjected to a 16-day test to mimic usage in an implantable cardiac defibrillator device, under accelerated conditions. The cells were positioned lying on their side with the positive terminal pin in the up position and then discharged at 37° C. under a 1.22 mA constant current background load with superimposed pulse trains. The pulse trains consisted of four 2.0 amp, 10-second pulses. On days 1 and 3, the cells were subjected to four pulses with 15 seconds rest between each pulse while on days 2 and 4 to 16 they were subjected to one pulse. This discharge protocol depleted the cells of about 1.1 Ah of total capacity.

Following discharge, the cells were destructively analyzed and visually examined for the presence of lithium clusters. The average number of clusters in the second group of cells having an E/C weight ratio of about 0.34 to about 0.37 was five times less than the control group. Furthermore, the average total lithium cluster area (a measure of the cumulative size of the lithium deposits) was twenty times less than the control group. This example illustrates the effectiveness of the present invention in limiting the formation of lithium clusters.

EXAMPLE II

Thirty-six Li/SVO cells similar in construction to those used in Example I were built with varying amounts of electrolyte fill weights. The cells were divided into two groups of 18 cells each. The first group contained SVO prepared at 375° C. according to U.S. Pat. No. 4,310,609 to Liang et al. while the second group had SVO prepared at 500° C. as described in U.S. Pat. No. 6,221,534 to Takeuchi et al. The cells containing the respectively prepared SVO materials were activated with an electrolyte of 11.0M LiAsF$_6$ in a 50:50, by volume, mixture of PC:DME. For each SVO type, there were three subgroups of six cells each. The subgroups had E/C weight ratios of about 0.52 to 0.54 (about 5% greater than the standard amount of about 0.46 to about 0.52), about 0.43 to 0.47 (about 10% less than the standard amount), and about 0.37 to 0.40 (about 30% less than the standard amount), respectively.

The cells were then subjected to a discharge protocol at 37° C. consisting of twelve 2.0 amp, 10-second pulses per train separated by 15-second intra-train rest periods. The cells received one 12-pulse train every 24 hours until a pulse minimum voltage of 1.5 V was reached. Resistance loads were not applied to the cells during testing.

TABLE 1

| Group 1 | E/C Ratio | Total Cumulative cluster (in²) | Group 2 | E/C Ratio | Total Cumulative cluster (in²) |
|---|---|---|---|---|---|
| High Fill Wt. | 0.52 | 0.0322 | High Fill Wt. | 0.52 | 0.0391 |
|  | 0.54 | 0.0350 |  | 0.53 | 0.0243 |
|  | 0.53 | 0.0319 |  | 0.53 | 0.0302 |
|  | 0.53 | 0.0293 |  | 0.52 | 0.0271 |
|  | 0.52 | 0.0228 |  | 0.52 | 0.0253 |
|  | 0.53 | 0.0280 |  | 0.52 | 0.0171 |
| avg. | 0.53 | 0.0299 | Avg. | 0.52 | 0.0272 |
| std. dev. | 0.0057 | 0.0042 | std. dev. | 0.0031 | 0.0073 |
| Med Fill Wt | 0.47 | 0.0082 | Med Fill Wt | 0.44 | 0.0036 |
|  | 0.42 | 0.0010 |  | 0.43 | 0.0010 |
|  | 0.44 | 0.0023 |  | 0.46 | 0.0192 |
|  | 0.43 | 0.0010 |  | 0.44 | 0.0047 |
|  | 0.43 | 0.0017 |  | 0.47 | 0.0097 |
|  | 0.46 | 0.0159 |  | 0.44 | 0.0030 |
| avg. | 0.44 | 0.0050 | avg. | 0.44 | 0.0069 |
| std. dev. | 0.0193 | 0.0060 | std. dev. | 0.0155 | 0.0067 |
| Low Fill Wt | 0.37 | 0.0004 | Low Fill Wt | 0.33 | 0.0000 |
|  | 0.37 | 0.0000 |  | 0.35 | 0.0001 |
|  | 0.37 | 0.0000 |  | 0.38 | 0.0000 |
|  | 0.38 | 0.0000 |  | 0.36 | 0.0002 |
|  | 0.37 | 0.0001 |  | 0.37 | 0.0000 |
|  | 0.40 | 0.0000 |  | 0.37 | 0.0004 |
| avg. | 0.38 | 0.0001 | avg. | 0.36 | 0.0001 |
| std. dev. | 0.0129 | 0.0002 | std. dev. | 0.0165 | 0.0002 |

Figure 2:
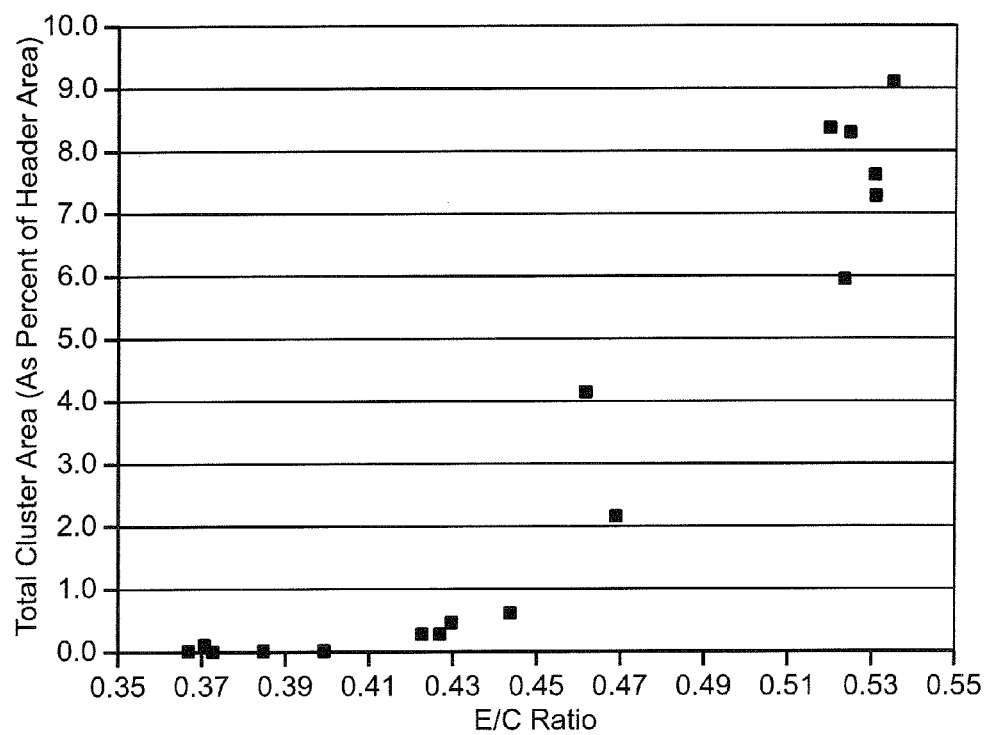
FIGS. 2 and 3 are graphs of the total lithium cluster area as a percentage of header area in Li/SVO cells activated with various electrolyte-to-cathode weight ratios and subjected to a pulse discharge regime intended to mimic usage in an implantable cardiac defibrillator.
Figure 3:
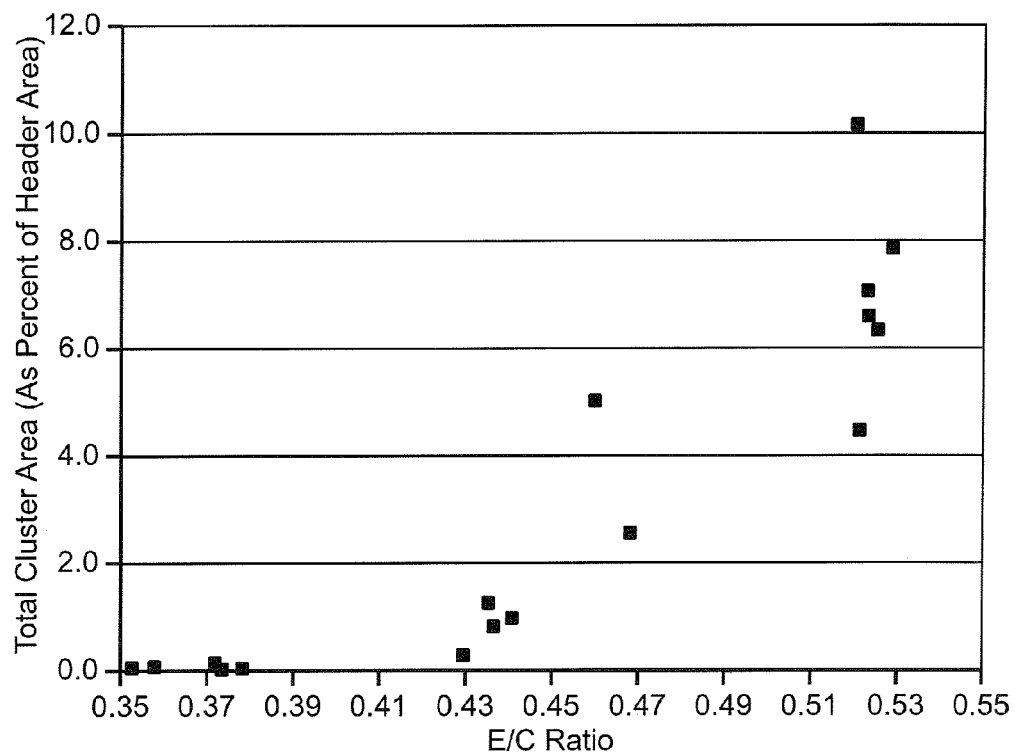

Following discharge, the cells were destructively analyzed and lithium cluster areas were measured and summarized. The results are presented in Table 1 and displayed in FIG. 2 for the cells having SVO cathode material prepared at 375° C. and in FIG. 3 for the cells having SVO prepared at 500° C. In these graphs, the total lithium cluster area as a percentage of header area in the destructively analyzed cells is plotted as a function of the E/C ratio. Since the amount of cathode material was constant for all cells used in this example, a lower E/C ratio is indicative of lower electrolyte weight.

Figure 4:
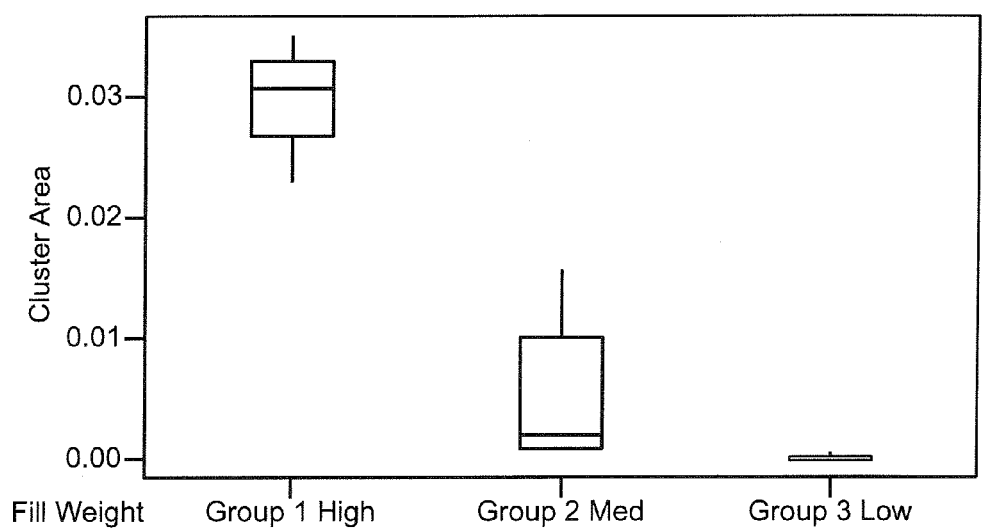
FIGS. 4 and 5 are box plot graphs of the Li/SVO cells used to construct the graphs of FIGS. 2 and 3 and grouped as having been activated with a high, medium or low electrolyte fill weight.
Figure 5:
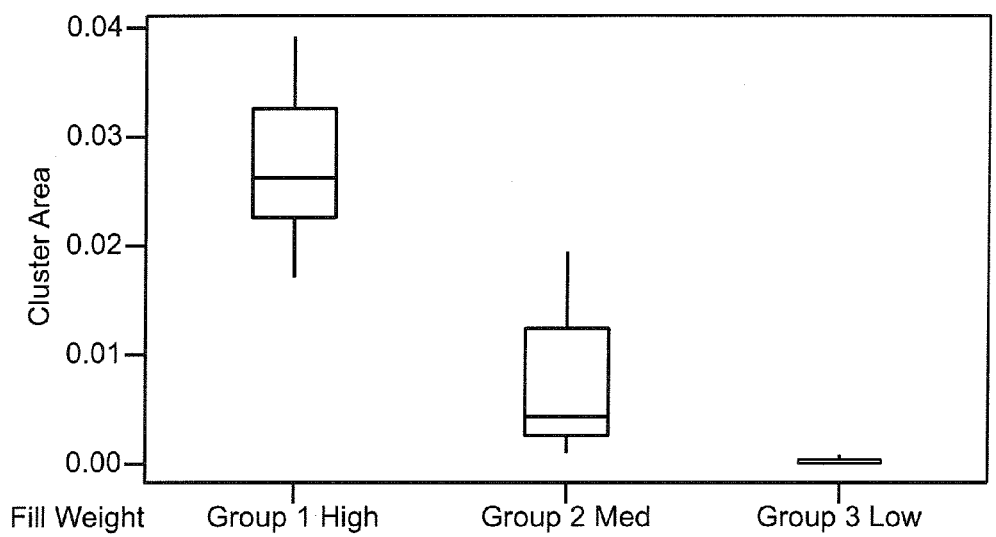

A box plot of the total cluster area for the cells plotted as a function of high, medium and low electrolyte fill weights is given in FIGS. 4 and 5 for the 375° C. and 500° C. SVO cells, respectively. As shown, decreasing electrolyte fill weight to an E/C ratio of less than about 0.46 significantly reduces the total lithium cluster area.

From this testing, it is concluded that the formation of lithium clusters is significantly reduced in a Li/SVO cell activated with an E/C weight ratio of less than about 0.46. The presence of lithium clusters are completely eliminated under pulse discharge conditions, such as experienced during activation of a cardiac defibrillator, with an E/C ratio less than about 0.40. Furthermore, while these examples use Li/SVO cells as the test vehicles, it is within the scope of the present invention that similar results will occur in other lithium-intercalation cathode chemistries. The reason, as previously described in detail, is that lithium clusters are the result of a higher Li$^+$ ion concentration in the electrolyte immediately adjacent to a surface that creates an anodically polarized region there. The specific cathode active material is not dispositive in that the resulting reduction of lithium ions-on the surface and the relaxing of the concentration gradient is regardless of the cathode active material.

It is appreciated that various modifications to the inventive concepts described herein may be apparent to those of ordinary skill in the art without departing from the scope of the present invention as defined by the appended claims.

What is claimed is:

1. An electrochemical cell, which comprises:
   a) a casing comprising a container having a sidewall extending to an opening closed by a lid;
   b) an anode positioned inside the casing and comprising lithium supported on an anode current collector connected to the casing;
   c) a cathode of silver vanadium oxide supported on a cathode current collector connected to a positive terminal pin extending through an opening in the casing, wherein the positive terminal pin is electrically insulated from the casing; and
   d) an electrolyte activating the anode and the cathode, wherein the electrolyte and the silver vanadium oxide are present in the cell in an electrolyte-to-cathode weight ratio (E/C) of about 0.40, or less, such that the cell is dischargeable without lithium precipitating from the electrolyte in an amount sufficient to bridge a nominal distance between a negative polarity terminal including the anode current collector connected to the casing and positive portions including the cathode current collector and the terminal pin.

2. The electrochemical cell of claim 1 wherein there is virtually no free flowing electrolyte inside the cell after about 2% DoD.

3. The electrochemical cell of claim 1 wherein the cell is dischargeable to deliver a pulse electrical current of a greater amplitude than that of a pre-pulse current or open circuit voltage immediately prior to the pulse.

4. The electrochemical cell of claim 1 wherein the cell is dischargeable to deliver a pulse of electrical current of about 15 mA/cm$^2$ to about 50 mA/cm$^2$.

5. The electrochemical cell of claim 1 wherein the cell is dischargeable to deliver a pulse train of one to four 5 to 20-second pulses of about 15 mA/cm$^2$ to about 50 mA/cm$^2$ with about a 2 to 30 second rest between each pulse.

6. The electrochemical cell of claim 1 wherein the cathode active material is selected from the group consisting of silver vanadium oxide, copper silver vanadium oxide, $V_2O_5$, $MnO_2$, $LiCoO_2$, $LiNiO_2$, $LiMn_2O_4$, $TiS_2$, $Cu_2S$, FeS, $FeS_2$, $Ag_2O$, $Ag_2O_2$, $CuF_2$, $Ag_2CrO_4$, copper oxide, copper vanadium oxide, and mixtures thereof.

7. The electrochemical cell of claim 1 wherein the anode is provided in a serpentine configuration with the cathode comprising cathode plates positioned between folds of a wind.

8. The electrochemical cell of claim 7 wherein there is a plurality of cathode plates having their current collectors connected to a manifold connected to the positive terminal pin.

9. An electrochemical call, which comprises:
   a) a casing comprising a container having a sidewall extending to an opening closed by a lid;
   b) an anode positioned inside the casing and comprising lithium supported on an anode current collector;
   c) a cathode of silver vanadium oxide supported on a cathode current collector, wherein one of the anode current collector and the cathode current collector is connected to the casing serving as the respective negative or positive polarity terminal and the other of the anode current collector and the cathode current collector is connected to a terminal pin extending through an opening in the casing and wherein the terminal pin in electrically insulated from the casing; and
   d) an electrolyte activating the anode and the cathode, wherein the electrolyte and the silver vanadium oxide are present in the cell in an electrolyte-to-cathode weight ratio (E/C) of about 0.40, or less, such that the cell is dischargeable without lithium precipitating from the electrolyte in an amount sufficient to bridge a nominal distance between the negative polarity anode and the positive polarity cathode.

10. The electrochemical cell of claim 9 where the E/C ratio is such that there is virtually no free flowing electrolyte inside the cell after about 2% DoD.

11. The electrochemical cell of claim 9 wherein the cell is dischargeable to deliver a pulse train of one to four 5 to 20-second pulses of about 15 mA/cm$^2$ to about 50 mA/cm$^2$ with about a 2 to 30 second rest between each pulse.

12. A method for powering an implantable medical device, comprising the steps of:
   a) providing a casing comprising a container having a sidewall extending to an opening closeable by a lid;
   b) positioning an anode inside the container, the anode comprising lithium supported on an anode current collector and connecting the anode to the container serving as the negative polarity terminal;
   c) positioning a cathode inside the casing, the cathode comprising silver vanadium oxide supported on a cathode current collector and connecting the cathode to a positive terminal pin extending through an opening in the casing, wherein the positive terminal pin is electrically insulated from the casing;
   d) closing the container with a lid and activating the anode and the cathode with an electrolyte;
   e) connecting the cell to the implantable medical device; and
   f) discharging the cell to power the implantable medical device, wherein the electrolyte is present in the casing in an electrolyte-to-cathode weight ratio (E/C) such that there is virtually no free-flowing electrolyte after discharging the cell to about 2% DoD, thereby preventing lithium from bridging a nominal distance between a negative polarity terminal including the anode current collector connected to the casing and positive polarity portions including the cathode current collector and the terminal pin.

13. The method of claim 12 including providing the cathode active material as silver vanadium oxide and the E/C ratio is about 0.40, or less.

14. The method of claim 12 including discharging cell to deliver a pulse train of one to four 5 to 20-second pulses of about 15 mA/cm$^2$ to about 50 mA/cm$^2$ with about a 2 to 30 second rest between each pulse.

15. The method of claim 12 including discharging the cell to power the implantable medical device selected from the group consisting of a cardiac pacemaker, a cardiac defibrillator, a drug pump, a neurostimulator, and a ventricular assist device.

16. An electrochemical cell, which comprises:
   a) a casing comprising a container having a sidewall extending to an opening closed by a lid;
   b) an anode positioned inside the casing and comprising lithium supported on an anode current collector connected to the casing;
   c) a cathode positioned inside the casing and comprising a cathode active material supported on a cathode current collector connected to a positive terminal pin extending through an opening in the casing, wherein the positive terminal pin is electrically insulated from the casing; and
   d) an electrolyte activating the anode and the cathode, wherein the electrolyte and the cathode active material are present in the cell in an electrolyte-to-cathode weight ratio (E/C) such that there is virtually no free flowing electrolyte inside the casing after about 2% DoD.

17. The electrochemical cell of claim 16 wherein the cathode active material is selected from the group consisting of silver vanadium oxide, copper silver vanadium oxide, $V_2O_5$, $MnO_2$, $LiCoO_2$, $LiNiO_2$, $LiMn_2O_4$, $TiS_2$, $Cu_2S$, FeS, $FeS_2$, $Ag_2O$, $Ag_2O_2$, $CuF_2$, $Ag_2CrO_4$, copper oxide, copper vanadium oxide, and mixtures thereof.

18. An electrochemical cell, which comprises:
   a) a casing comprising a container having a sidewall extending to an opening closed by a lid;
   b) an anode positioned inside the casing and comprising lithium supported on an anode current collector connected to the casing;
   c) a cathode of silver vanadium oxide supported on a cathode current collector connected to a positive terminal pin extending through an opening in the casing, wherein the positive terminal pin is electrically insulated from the casing; and
   d) an electrolyte activating the anode and the cathode, wherein the electrolyte and the silver vanadium oxide are present in the cell in an electrolyte-to-cathode weight ratio (E/C) of about 0.46, or less, such that the cell is dischargeable without lithium precipitating from the electrolyte in an amount sufficient to bridge a nominal distance of about 0.05 inches to about 0.15 inches between a negative polarity terminal including the anode current collector connected to the casing and positive portions including the cathode current collector and the terminal pin.

19. An electrochemical call, which comprises:
   a) a casing comprising a container having a sidewall extending to an opening closed by a lid;
   b) an anode positioned inside the casing and comprising lithium supported on an anode current collector;
   c) a cathode positioned inside the casing and comprising a cathode active material supported on a cathode current collector, wherein one of the anode current collector and the cathode current collector is connected to the casing serving as the respective negative or positive polarity terminal and the other of the anode current collector and the cathode current collector is connected to a terminal pin extending through an opening in the casing and wherein the terminal pin in electrically insulated from the casing; and
   d) an electrolyte activating the anode and the cathode, wherein the electrolyte and the cathode active material are present in the cell in an electrolyte-to-cathode weight ratio (E/C) such that there is virtually no free flowing electrolyte inside the casing after about 2% DoD.

20. The electrochemical cell of claim 19 wherein the cathode active material is selected from the group consisting of silver vanadium oxide, copper silver vanadium oxide, $V_2O_5$, $MnO_2$, $LiCoO_2$, $LiNiO_2$, $LiMn_2O_4$, $TiS_2$, $Cu_2S$, FeS, $FeS_2$, $Ag_2O$, $Ag_2O_2$, $CuF_2$, $Ag_2CrO_4$, copper oxide, copper vanadium oxide, and mixtures thereof.

21. A method for powering an implantable medical device, comprising the steps of:
   a) providing a casing comprising a container having a sidewall extending to an opening closeable by a lid;
   b) positioning an anode inside the container, the anode comprising lithium supported on an anode current collector and connecting the anode to the container serving as the negative polarity terminal;
   c) positioning a cathode inside the casing, the cathode comprising a cathode active material supported on a cathode current collector and connecting the cathode to a positive terminal pin extending through an opening in the casing, wherein the positive terminal pin is electrically insulated from the casing;

d) closing the container with a lid and activating the anode and the cathode with an electrolyte;

e) connecting the cell to the implantable medical device; and f) discharging the cell to power the implantable medical device, wherein the electrolyte is present in the casing in an electrolyte-to-cathode weight ratio (E/C) of about 0.46 such that there is virtually no free-flowing electrolyte after discharging the cell to about 30% DoD, thereby preventing lithium from bridging a nominal distance between a negative polarity terminal including the anode current collector connected to the casing and positive polarity portions including the cathode current collector and the terminal pin.

22. The method of claim 21 including selecting the cathode active material from the group consisting of silver vanadium oxide, copper silver vanadium oxide, $V_2O_5$, $MnO_2$, $LiCoO_2$, $LiNiO_2$, $LiMn_2O_4$, $TiS_2$, $Cu_2S$, FeS, $FeS_2$, $Ag_2O$, $Ag_2O_2$, $CuF_2$, $Ag_2CrO_4$, copper oxide, copper vanadium oxide, and mixtures thereof.

23. A method for powering an implantable medical device, comprising the steps of:

a) providing a casing comprising a container having a sidewall extending to an opening closeable by a lid;

b) positioning an anode inside the container, the anode comprising lithium supported on an anode current collector and connecting the anode to the container serving as the negative polarity terminal;

c) positioning a cathode inside the casing, the cathode comprising silver vanadium oxide supported on a cathode current collector and connecting the cathode to a positive terminal pin extending through an opening in the casing, wherein the positive terminal pin is electrically insulated from the casing;

d) closing the container with a lid and activating the anode and the cathode with an electrolyte;

e) connecting the cell to the implantable medical device; and f) discharging the cell to power the implantable medical device, wherein the electrolyte is present in the casing in an electrolyte-to-cathode weight ratio (E/C) of about 0.40, or less, such that discharging the cell does not result in lithium bridging a nominal distance between a negative polarity terminal including the anode current collector connected to the casing and positive polarity portions including the cathode current collector and the terminal pin.

24. The method of claim 23 including discharging cell to deliver a pulse train of one to four 5 to 20-second pulses of about 15 $mA/cm^2$ to about 50 $mA/cm^2$ with about a 2 to 30 second rest between each pulse.

* * * * *

UNITED STATES PATENT AND TRADEMARK OFFICE
CERTIFICATE OF CORRECTION

PATENT NO. : 7,432,001 B1 Page 1 of 1
APPLICATION NO. : 11/007933
DATED : October 7, 2008
INVENTOR(S) : Takeuchi et al.

It is certified that error appears in the above-identified patent and that said Letters Patent is hereby corrected as shown below:

Column 3, line 64, delete "VIIB, VIIB and VIII" and insert --VIB, VIIB, VIII--

Column 5, line 37, delete "Insulator is" and insert --Insulator 38 is--

Column 7, line 64, delete "thermal spay" and insert --thermal spray--

Column 8, line 57, delete "11.0M" and insert --1.0M--

Column 12, line 29, delete "electrochemical call" and insert --electrochemical cell--

Signed and Sealed this

Sixteenth Day of December, 2008

JON W. DUDAS
*Director of the United States Patent and Trademark Office*